(12) United States Patent
Uchida et al.

(10) Patent No.: US 10,573,141 B2
(45) Date of Patent: *Feb. 25, 2020

(54) SECURITY SYSTEM, SECURITY METHOD, AND NON-TRANSITORY COMPUTER READABLE MEDIUM

(71) Applicant: NEC Corporation, Tokyo (JP)

(72) Inventors: Kaoru Uchida, Tokyo (JP); Nobuyuki Yamashita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/126,777

(22) Filed: Sep. 10, 2018

(65) Prior Publication Data

US 2019/0005786 A1    Jan. 3, 2019

Related U.S. Application Data

(63) Continuation of application No. 14/916,702, filed as application No. PCT/JP2014/004583 on Sep. 5, 2014.

(30) Foreign Application Priority Data

Sep. 6, 2013 (JP) .................................. 2013-185130

(51) Int. Cl.
*G06K 9/00* (2006.01)
*G06T 7/20* (2017.01)
*G08B 13/196* (2006.01)

(52) U.S. Cl.
CPC ... *G08B 13/19608* (2013.01); *G06K 9/00771* (2013.01); *G06T 7/20* (2013.01);
(Continued)

(58) Field of Classification Search
None
See application file for complete search history.

(56) References Cited

U.S. PATENT DOCUMENTS 4,839,631 A    6/1989  Tsuji
6,421,462 B1   7/2002  Christian et al.
(Continued)

FOREIGN PATENT DOCUMENTS

CN    101268478 A    9/2008
CN    101295363 A    10/2008
(Continued)

OTHER PUBLICATIONS

Office Action dated May 3, 2019, by the United States Patent and Trademark Office in counterpart U.S. Appl. No. 14/916,702.
(Continued)

*Primary Examiner* — Soo Shin
(74) *Attorney, Agent, or Firm* — Finnegan, Henderson, Farabow, Garrett & Dunner, L.L.P.

(57) ABSTRACT

A security system (10) includes an image information acquisition unit (11) that acquires input image information on an image taken of a person in a store, a tracking unit (12) that tracks an action of a hand of the person based on the input image information, and a suspicious action detection unit (13) that detects a suspicious action of the person based on the tracked action of the hand. A security system, a security method, and a security program capable of accurately detecting a suspicious action are thereby provided.

9 Claims, 10 Drawing Sheets

(52) U.S. Cl.
CPC . *G08B 13/19613* (2013.01); *G08B 13/19645* (2013.01); *G06K 9/00355* (2013.01)

(56) References Cited

U.S. PATENT DOCUMENTS

| | | | |
|---|---|---|---|
| 7,036,094 B1* | 4/2006 | Cohen | G06K 9/00348 715/863 |
| 9,589,433 B1* | 3/2017 | Thramann | G08B 13/19613 |
| 2004/0120581 A1 | 6/2004 | Ozer et al. | |
| 2005/0108063 A1* | 5/2005 | Madill, Jr. | G06Q 40/08 705/4 |
| 2006/0243798 A1* | 11/2006 | Kundu | G06Q 20/00 235/383 |
| 2007/0182818 A1* | 8/2007 | Buehler | G08B 13/19602 348/143 |
| 2008/0018738 A1* | 1/2008 | Lipton | G06K 9/00771 348/143 |
| 2013/0182114 A1 | 7/2013 | Zhang et al. | |
| 2013/0277423 A1* | 10/2013 | Toyokawa | G07G 1/009 235/375 |
| 2014/0347479 A1* | 11/2014 | Givon | G06K 9/00342 348/143 |
| 2015/0146921 A1* | 5/2015 | Ono | H04N 7/18 382/103 |
| 2016/0328604 A1* | 11/2016 | Bulzacki | G06K 9/00335 |

FOREIGN PATENT DOCUMENTS

| | | |
|---|---|---|
| CN | 102024297 A | 4/2011 |
| CN | 102881100 A | 1/2013 |
| CN | 202995945 U | 6/2013 |
| CN | 103262130 A | 8/2013 |
| JP | 61-260391 | 11/1986 |
| JP | 62-115388 | 5/1987 |
| JP | 2008-257487 | 10/2008 |
| JP | 2009-9231 | 1/2009 |
| JP | 2009-48430 | 3/2009 |
| JP | 2010-94332 | 4/2010 |
| JP | 2010-238186 | 10/2010 |
| JP | 2011-65328 | 3/2011 |
| JP | 2011-108169 | 6/2011 |
| JP | 2012-32910 | 2/2012 |

OTHER PUBLICATIONS

International Search Report and Written Opinion dated Dec. 9, 2014 in corresponding PCT International Application.
Notification of First Office Action issued by the State Intellectual Property Office of the People's Republic of China in counterpart Chinese Patent Application No. 201480048366.4, dated Feb. 4, 2017.
Zhou et al., "Anomalous Event Detection Based on Self-Organizing Map for Supermarket Monitoring", International Conference on information Engineering and Computer Science IEEE, 2009:1-4, 4 pages, (2009).
Notification of Reasons for Refusal issued by the Japanese Patent Office in counterpart Japanese Patent Application No. 2015-535321, dated Apr. 25, 2017.
Notification of the Second Office Action dated Oct. 30, 2017, issued in counterpart Chinese Patent Application No. 201480048366.4.
Notification of Third Office Action dated May 21, 2018, issued by The State Intellectual Property Office of the Peoples Republic of China, in counterpart Chinese Patent Application No. 201480048366.4.
Haritaoglu et al., "Backpack: Detection of People Carrying Objects Using Silhouettes," Computer Vision and Image Understanding, 81 (3) (2001), pp. 385-397 (Year: 2001).

* cited by examiner

SECURITY SYSTEM, SECURITY METHOD, AND NON-TRANSITORY COMPUTER READABLE MEDIUM

CROSS-REFERENCE TO RELATED PATENT APPLICATIONS

This application is a continuation of U.S. patent application Ser. No. 14/916,702, filed Mar. 4, 2016, which is a National Stage Entry of International Application No. PCT/JP2014/004583, filed Sep. 5, 2014, which claims priority from Japanese Patent Application No. 2013-185130, filed Sep. 6, 2013. The entire contents of the above-referenced applications are expressly incorporated herein by reference.

TECHNICAL FIELD

The present invention relates to a security system, a security method, and a non-transitory computer readable medium storing a security program and, particularly, to a security system, a security method, and a non-transitory computer readable medium storing a security program using person images.

BACKGROUND ART

Damage caused by shoplifting by customers, misappropriation by part-time employees and the like are a continuous and growing concern for stores. In order to prevent such misconduct, a store staff or a store manager keeps an eye on these customers and part-time employees, or records images monitored by a general 2D camera and visually checks them afterwards.

Since it is inefficient to visually check for the occurrence of misconduct, the systems disclosed in Patent Literatures 1 to 5 as related art, for example, are under development.

CITATION LIST

Patent Literature

PTL1: Japanese Unexamined Patent Publication No. 2011-065328
PTL2: Japanese Unexamined Patent Publication No. 2010-094332
PTL3: Japanese Unexamined Patent Publication No. 2009-048430
PTL4: Japanese Unexamined Patent Publication No. 2009-009231
PTL5: Japanese Unexamined Patent Publication No, 2008-257487

SUMMARY OF INVENTION

Technical Problem

For example, according to the techniques disclosed in related art like Patent Literature 1, when the number of times a store staff's face swings is a specified value of more and the cancelled amount of money in a cash register is a reference value or more, it is detected that a suspicious conduct (suspicious action) has occurred.

However, because the technique of the related art performs detection based on a swing of a face or the like, it fails to detect a suspicious action of a shop staff and the like in some cases. For example, although a suspicious action is often carried out by a hand, the technique of the related art cannot detect the behavior on the basis of a hand action.

Thus, the technique disclosed in the related art has a problem that it is difficult to accurately detect a suspicious action of a store staff, a customer and the like.

In light of the above, an exemplary object of the present invention is to provide a security system, a security method, and a non-transitory computer readable medium storing a security program capable of accurately detecting a suspicious action.

Solution to Problem

A security system according to an exemplary aspect of the present invention includes an image information acquisition unit that acquires input image information on an image taken of a person in a store, a tracking unit that tracks an action of a hand of the person based on the input image information, and a suspicious action detection unit that detects a suspicious action of the person based on the tracked action of the hand.

A security method according to an exemplary aspect of the present invention includes acquiring input image information on an image taken of a person in a store, tracking an action of a hand of the person based on the input image information, and detecting a suspicious action of the person based on the tracked action of the hand.

A non-transitory computer readable medium storing a security program according to an exemplary aspect of the present invention causes a computer to perform a security process including acquiring input image information on an image taken of a person in a store, tracking an action of a hand of the person based on the input image information, and detecting a suspicious action of the person based on the tracked action of the hand.

Advantageous Effects of Invention

According to the exemplary aspects of the present invention, it is possible to provide a security system, a security method, and a non-transitory computer readable medium storing a security program capable of accurately detecting a suspicious action.

DESCRIPTION OF EMBODIMENTS

Overview of Exemplary Embodiment

Figure 1:
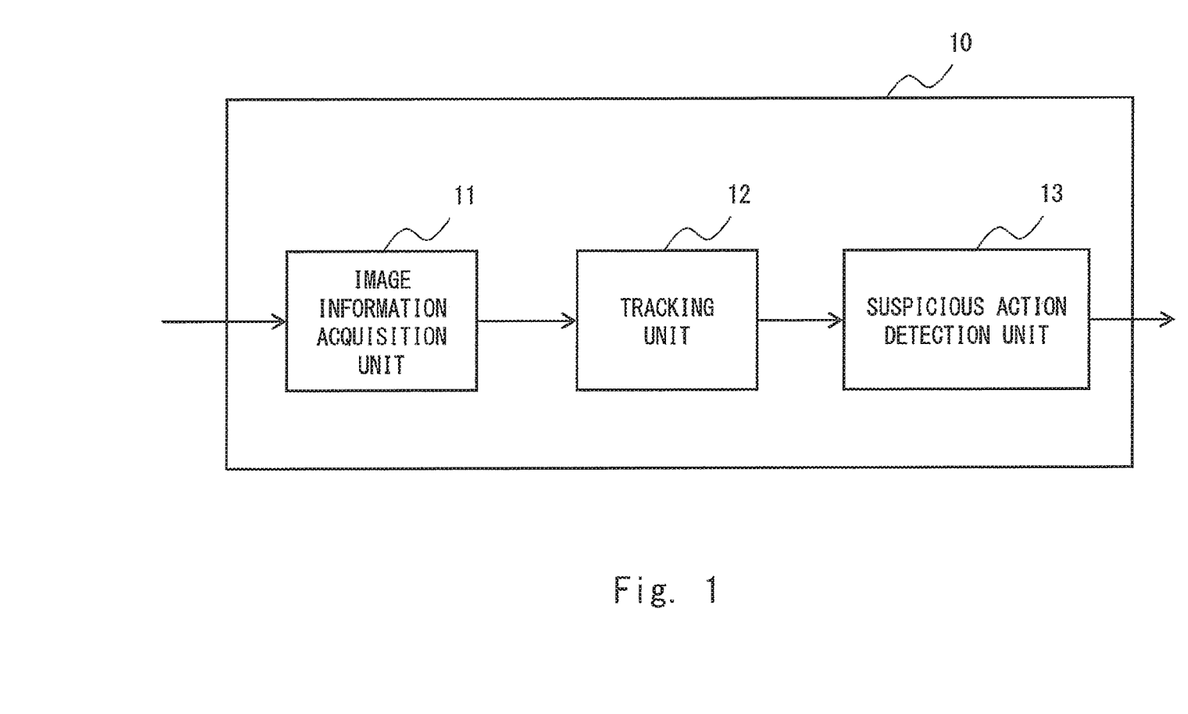
FIG. 1 is a block diagram showing main elements of a security system according to an exemplary embodiment.

Prior to describing exemplary embodiments, the overview of the characteristics of the exemplary embodiments is described hereinbelow. FIG. 1 shows main elements of a security system according to an exemplary embodiment.

As shown in FIG. 1, a security system 10 according to this exemplary embodiment includes an image information acquisition unit 11, a tracking unit 12, and a suspicious action detection unit 13. The image information acquisition unit 11 acquires input image information, which is an image taken of a person in a store. The tracking unit 12 tracks a hand action of a person based on the acquired input image information. The suspicious action detection unit 13 detects a suspicious action of a person based on the tracked hand action.

As described above, in the exemplary embodiment, a hand action of a person in a store is tracked, and a suspicious action is detected based on the tracking result. For example, by tracking a hand action of a customer or a store staff in front of a product shelf in a store, it is possible to accurately detect a suspicious action that can lead to shoplifting or misappropriation.

First Exemplary Embodiment

Figure 2:
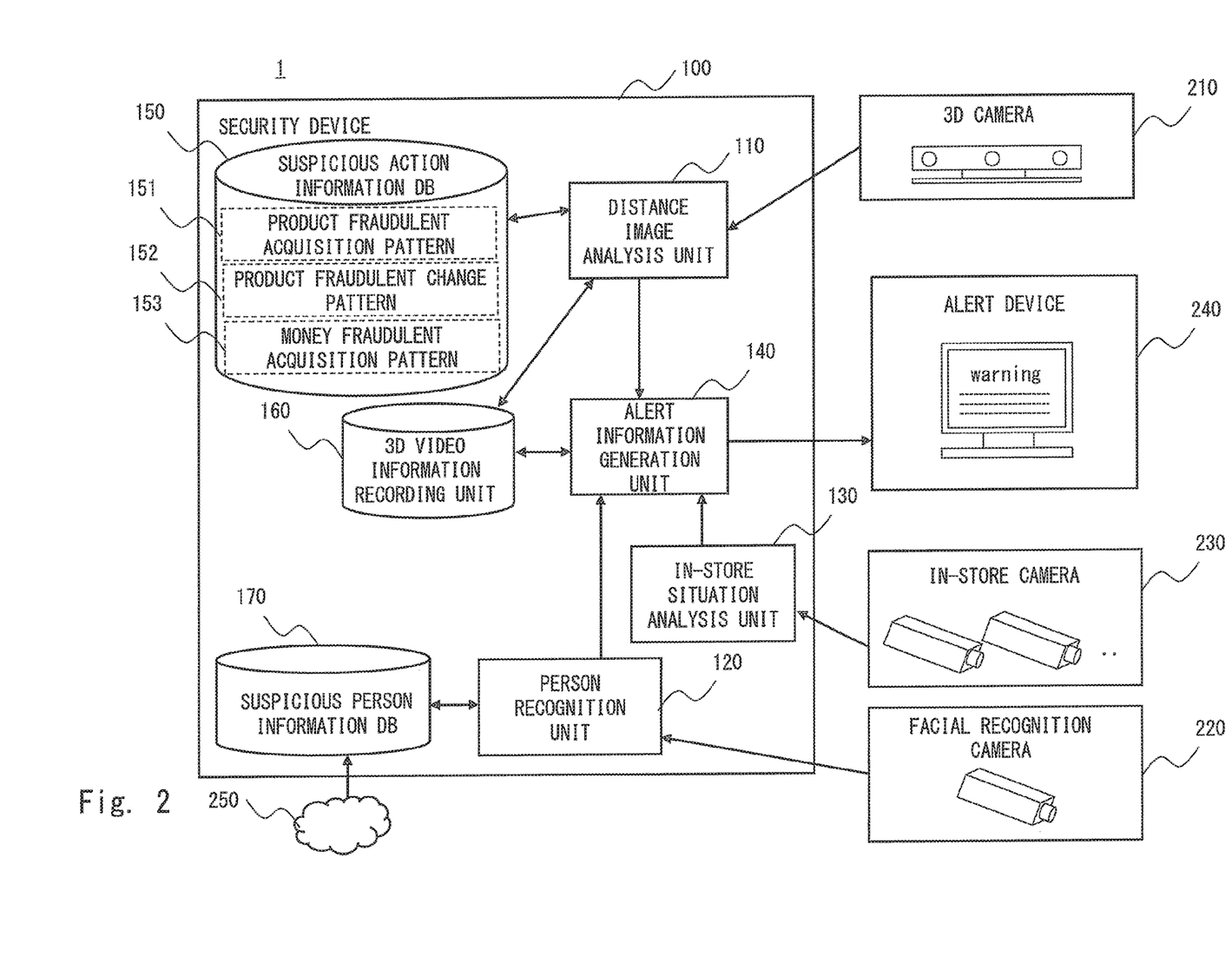
FIG. 2 is a block diagram showing the configuration of a security system according to a first exemplary embodiment.

A first exemplary embodiment is described hereinafter with reference to the drawings. FIG. 2 is a block diagram showing the configuration of a security system according to this exemplary embodiment. This security system is a system that detects a suspicious action of a customer or a store staff in a store or the like and outputs (displays) an alert (alarm) and the like. Note that customer includes all persons who come to (enter) a store, and the store staff includes all persons who work in a store.

As shown in FIG. 2, a security system 1 according to this exemplary embodiment includes a security device 100, a 3D camera 210, a facial recognition camera 220, an in-store camera 230, and an alert device 240. For example, while the respective components of the security system 1 are placed in the same store, the security device 100 or the alert device 240 may be placed outside the store. Although it is assumed in the following description that the respective components of the security system 1 are separate devices, the respective components may be one or any number of devices.

The 3D (three-dimensional) camera 210 is an imaging device (distance image sensor) that takes an image of and measures a target and generates a distance image (distance image information). The distance image (range image) contains image information which is an image of a target taken and distance information which is a distance to a target measured. For example, the 3D camera 210 is Microsoft Kinect (registered trademark) or a stereo camera. By using the 3D camera, it is possible to recognize (track) a target (a customer's action or the like) including the distance information, and it is thus possible to perform highly accurate recognition.

Figure 3A:
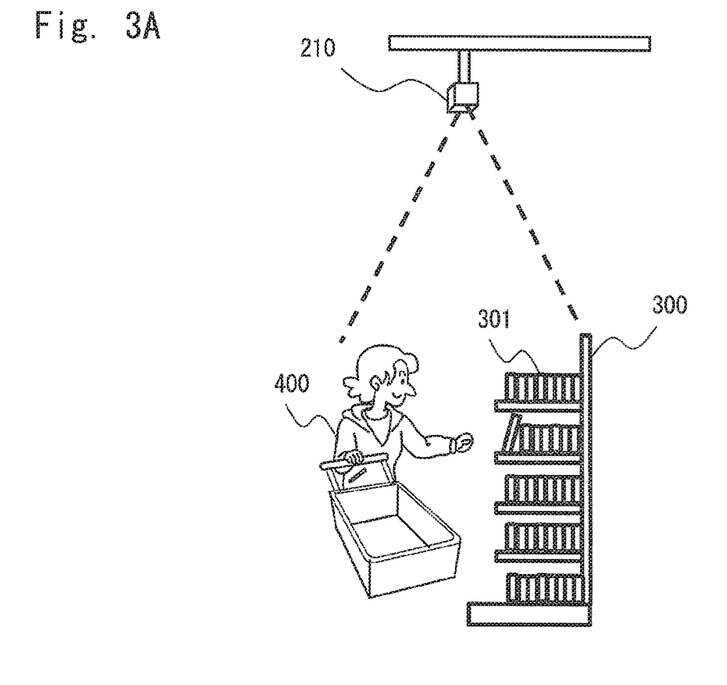
FIG. 3A is a diagram showing a configuration example of a 3D camera according to the first exemplary embodiment.
Figure 3B:
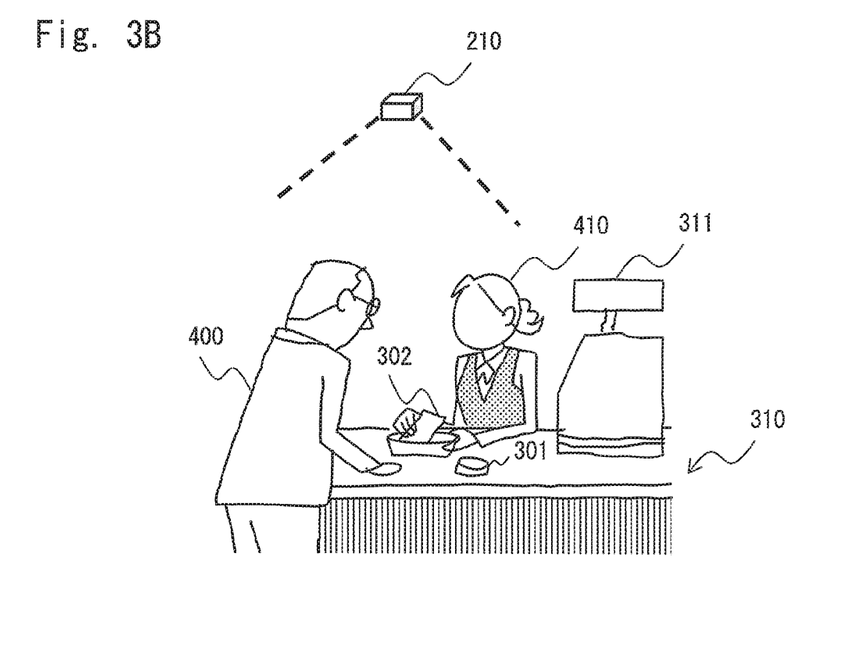
FIG. 3B is a diagram showing a configuration example of a 3D camera according to the first exemplary embodiment.

As shown in FIGS. 3A and 3B, in order to detect a suspicious action by a hand of a customer or a store staff, the 3D camera 210 takes an image of a customer or a store staff at a specified position in a store in this exemplary embodiment. In the example of FIG. 3A, the 3D camera 210 takes an image of a product shelf (product display shelf) 300 on which a product 301 is placed (displayed), and particularly takes an image of a customer 400 who is about to touch the product 301 in front of the product shelf 300. The 3D camera 210 takes an image of a product placement area of the product shelf 300 and an area where a customer picks up/looks at a product in front of the product shelf 300, which is a presentation area where a product is presented to a customer in the product shelf 300. The 3D camera 210 is placed at a position where images of the product shelf 300 and the customer 400 in front of (in the vicinity of) the product shelf 300 can be taken, which is, for example, above (the ceiling etc.) or in front of (a wall etc.) of the product shelf 300, or in the product shelf 300.

In the example of FIG. 3B, the 3D camera 210 takes an image of a checkout stand 310 where a cash register 311 is placed, and particularly takes an image of a store staff 410 who is standing in front of the checkout stand 310 and about to sell the product 301 to the customer 400 or the store staff 410 who is about to touch money 302. The 3D camera 210 is placed at a position where images of the checkout stand 310 and the store staff 410 in front of (in the vicinity of) the checkout stand 310 can be taken, which is, for example, above (the ceiling etc.) or in front of (a wall etc.) of the checkout stand 310, or on the checkout stand 310 (cash register 311).

Note that, although an example in which the 3D camera 210 is used as a device that takes images of the product shelf 300 and the checkout stand 310 is described below, it is not limited to the 3D camera but may be a general camera (2D camera) that outputs only images taken. In this case, tracking is performed using the image information only.

Each of the facial recognition camera 220 and the in-store camera 230 is an imaging device (2D camera) that takes and generates an image of a target. The facial recognition camera 220 is placed at the entrance of a store or the like, takes an image of a face of a customer who comes to the store and generates a facial image to recognize the customer's face. The in-store camera 230 is placed at a plurality of positions in a store, takes an image of each section in the store and generates an in-store image to detect the congestion of customers in the store. Note that each of the facial recognition camera 220 and the in-store camera 230 may be a 3D camera. By using a 3D camera, it is possible to accurately recognize the customer's face or the congestion in a store.

The alert device 240 is a device that notifies (outputs) alert information to a surveillant such as a store manager, a business manager or a security guard and performs recording. The way to transmit (output) alert information to a surveillant is not limited, and it may be a display of letters and images on a display device, audio output through a speaker or the like. The alert device 240 is placed at a position where a surveillant can view (hear) the alert information. The alert device 240 may be an employee terminal in a shelf, a cash register, a guard's room or a store, or it may be a surveillance device connected to the outside of a store via a network. For example, the alert device 240 is a computer including a display device and a storage device, such as a personal computer or a server computer.

As shown in FIG. 2, the security device 100 includes a distance image analysis unit 110, a person recognition unit 120, an in-store situation analysis unit 130, an alert information generation unit 140, a suspicious action information DB (database) 150, a 3D video information recording unit 160, and a suspicious person information DB 170. Note that, although those blocks are described as the functions of the security device 100 in this example, another configuration may be used as long as the operation according to this exemplary embodiment, which is described later, can be achieved.

Each element in the security device 100 may be formed by hardware or software or both of them, and may be formed by one hardware or software or a plurality of hardware or software. For example, the product information DB 150 and the customer information DB 160 may be storage devices connected to an external network (cloud). Each function (each processing) of the security device 100 may be implemented by a computer including CPU, memory and the like. For example, a security program for performing a security method (security process) according to the exemplary embodiments may be stored in a storage device, and each function may be implemented by executing the security program stored in the storage device on the CPU.

This security program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

The distance image analysis unit 110 acquires a distance image generated by the 3D camera 210, tracks a detection target based on the acquired distance image, and recognizes its action. In this exemplary embodiment, the distance image analysis unit 110 mainly tracks and recognizes a hand action of a customer or a store staff. The distance image analysis unit 110 refers to the suspicious action information DB 150 to recognize a suspicious action of a customer or a store staff contained in the distance image. Further, the distance image analysis unit 110 performs detection necessary for recognition of a suspicious action, determination of a suspicion level and the like. For example, the distance image analysis unit 110 detects a time period during which a suspicious action is carried out, the quantity of target products, the amount of money, the scale of a target act (the size of damage etc.) and the like as well. Further, the distance image analysis unit 110 records the distance image acquired from the 3D camera 210 as a 3D video in the 3D video information recording unit 160.

The person recognition unit 120 acquires a facial image of a customer generated by the facial recognition camera 220 and recognizes a person contained in the acquired facial image. The person recognition unit 120 refers to the suspicious person information DB 170 and makes comparison of it with the facial image, and thereby determines whether the customer is a suspicious person or not. The in-store situation analysis unit 130 acquires an in-store image generated by the in-store camera 230, analyzes the number of customers in the store based on the acquired in-store image and detects the congestion in the store.

The alert information generation unit 140 generates alert information to be transmitted to a surveillant based on detection results of the distance image analysis unit 110, the person recognition unit 120 and the in-store situation analysis unit 130, and outputs the generated alert information to the alert device 240. The alert information generation unit 140 generates and outputs the alert information based on the hand action of a customer or a store staff detected by the distance image analysis unit 110, the alert information based on the suspicious person recognized by the person recognition unit 120, and the alert information based on the congestion in the store analyzed by the in-store situation analysis unit 130. Further, the alert information generation unit 140 may record the generated alert information in a 3D video of the 3D video information recording unit 160.

The suspicious action information DB 150 stores suspicious action patterns (suspicious action pattern information) for detecting a suspicious action of a customer or a store staff. Note that a suspicious action is an action (preliminary act) that raises suspicion of misconduct by a person such as a customer or a store staff. The suspicious action information DB 150 stores a product fraudulent acquisition pattern 151, a product fraudulent change pattern 152, a money fraudulent acquisition pattern 153 and the like, for example, as the suspicious action patterns.

The product fraudulent acquisition pattern 151 is pattern information about actions of fraudulently acquiring a product, which include, for example, an action of a customer that puts a product in an improper place other than a shopping basket or cart. The product fraudulent change pattern 152 is pattern information about actions of fraudulently changing a product, which include, for example, an action of a customer that breaks or damages a product. The money fraudulent acquisition pattern 153 is pattern information about actions of fraudulently acquiring money, which include, for example, an action of a store staff that puts money from a cash register in an improper place such as a pocket of the store staff.

The suspicious person information DB 170 stores suspicious person identification information for detecting that a customer who comes to a store is a suspicious person. The suspicious person includes a person with a previous record, a habitual offender and a person on a blacklist, and the suspicious person identification information contains the name, gender, age, facial image information (image) and the like. For example, the suspicious person information DB 170 acquires and stores suspicious person information such as persons with previous records from a cloud (cloud network) 250 or the like, and further stores suspicious person information such as habitual offenders (persons on the blacklist) based on the history in the store.

Figure 4:
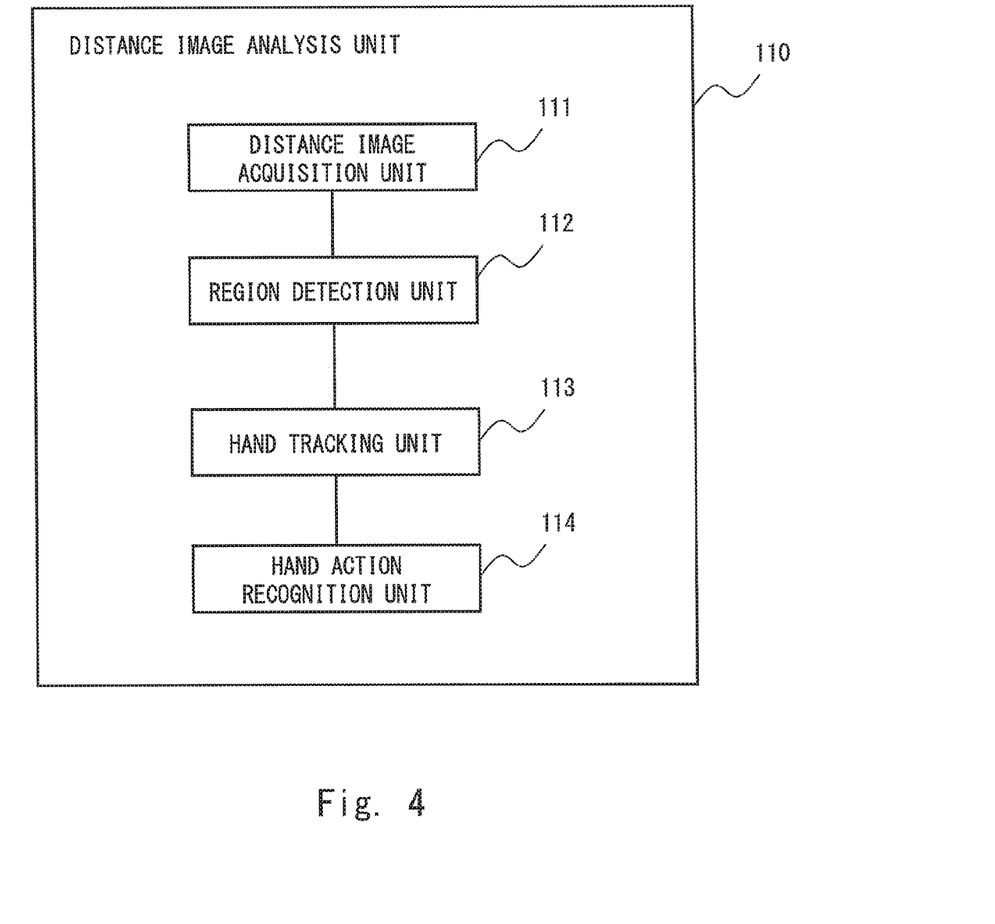
FIG. 4 is a block diagram showing a configuration of a distance image analysis unit according to the first exemplary embodiment.

FIG. 4 shows the configuration of the distance image analysis unit 110 in the security device 100. As shown in FIG. 4, the distance image analysis unit 110 includes a distance image acquisition unit 111, a region detection unit 112, a hand tracking unit 113, and a hand action recognition unit 114. Although the elements for recognizing a person's hand action are mainly described below, a person's face, line of sight, product, money and the like can be detected by elements similar to those for recognizing a person's hand action.

The distance image acquisition unit ill acquires a distance image containing a customer or a store staff which is taken and generated by the 3D camera 210. The region detection unit 112 detects a region of each part of a customer or a store staff contained in the distance image acquired by the distance image acquisition unit 111.

The hand tracking unit 113 tracks the action of a hand of a customer or a store staff detected by the region detection unit 112. The hand action recognition unit 114 recognizes a suspicious action of the customer or the store staff based on the hand action tracked by the hand tracking unit 113. For example, based on the suspicious action information DB 150, the hand action recognition unit 114 determines whether the suspicious action corresponds to a product fraudulent acquisition pattern such as putting a product in a pocket, a product fraudulent change pattern such as breaking a product, or a money fraudulent acquisition pattern such as putting money in a pocket of clothes.

A security method (security process) that is performed in the security system (security device) according to this exemplary embodiment is described hereinafter with reference to FIG. 5.

Figure 5:
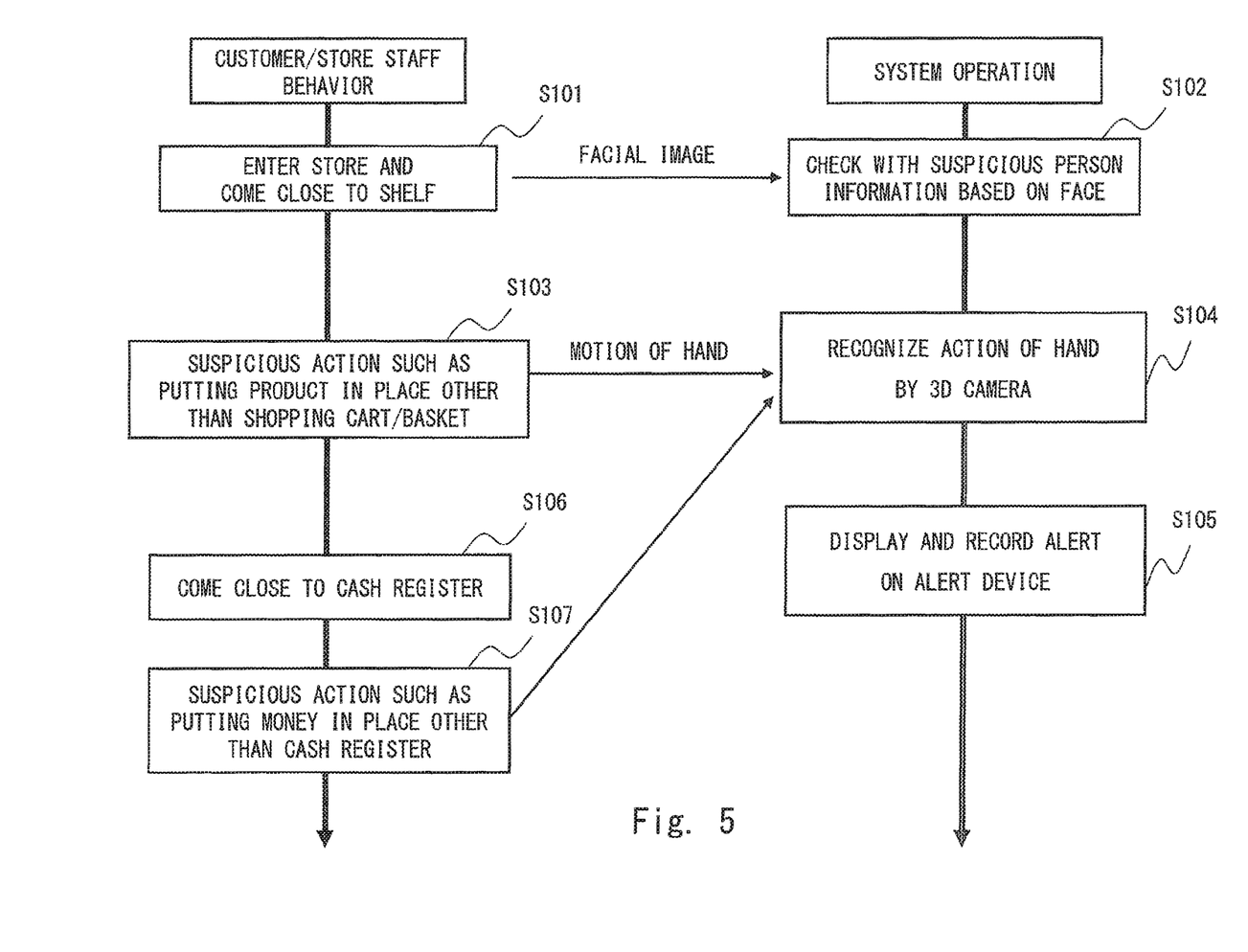
FIG. 5 is a flowchart showing the operation of the security system according to the first exemplary embodiment.

As shown in FIG. 5, a customer enters a store and comes close to a shelf in the store (S101). Then, the facial recognition camera 220 in the store generates a facial image of the customer, and the security device 100 checks the facial image against suspicious person information such as a list of persons with previous records/on the blacklist (S102). Specifically, the person recognition unit 120 of the security device 100 compares the facial image taken by the facial recognition camera 220 with facial image information of suspicious persons (a list of persons with previous records/on the blacklist) stored in the suspicious person information DB 170 and searches for a person regarding which the facial image and facial image information match and thereby determines whether the customer is a suspicious person or not.

After that, the customer performs a suspicious action such as putting a product in a place other than a shopping basket or cart (S103). Then, the 3D camera 210 in the vicinity of the shelf takes an image of the customer's hand, and the security device 100 recognizes the action of the customer's hand by using the distance image of the 3D camera 210 (S104). Specifically, the distance image analysis unit 110 in the security device 100 tracks the distance image of an image of the customer's hand, and recognizes that the customer has picked up the product and put it in an improper place.

Then, the security device 100 determines that a suspicious action has taken place based on the customer's hand action recognized in S104, and displays and records an alert on the alert device 240 such as a store staff terminal or a security guard terminal (S105). Specifically, the alert information generation unit 140 of the security device 100 generates and outputs alert information indicating a determination that a suspicious action has taken place. Further, the alert information generation unit 140 generates and outputs alert information based on the suspicious person recognized in S102.

Further, besides a customer, a store staff comes close to a checkout stand (S106) and performs a suspicious action such as putting money in a place other than a cash register (S107). Then, in the same manner as in the case of the customer's action, the security device 100 recognizes the action of the store staff's hand by using the distance image of the 3D camera 210 (S104), and displays and records an alert on the alert device 240 (S105).

Figure 6:
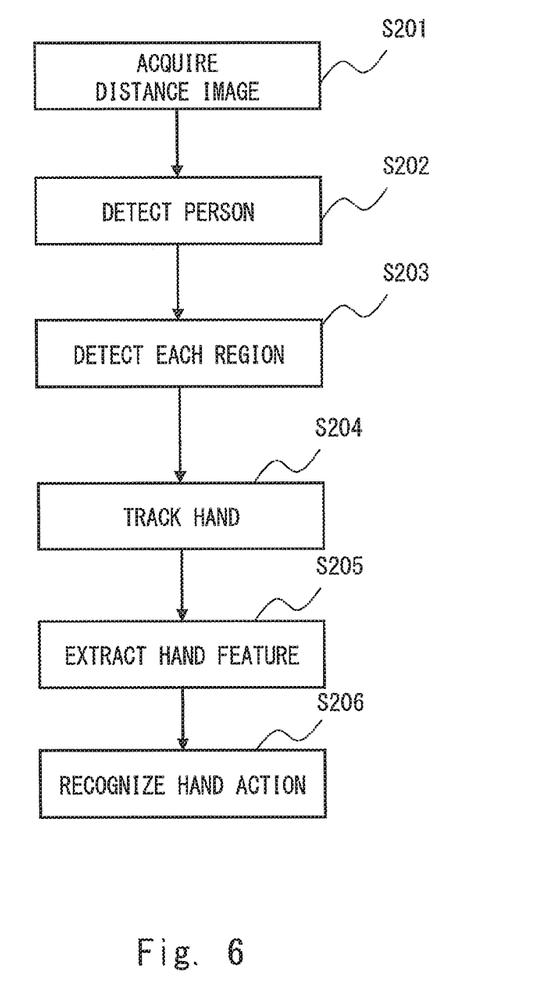
FIG. 6 is a flowchart showing the operation of a distance image analysis process according to the first exemplary embodiment.

FIG. 6 shows the details of a recognition processing (tracking processing) performed by the distance image analysis unit 110 in S104 of FIG. 5. Note that, the processing shown in FIG. 6 is one example, and the action of a hand may be recognized by another image analysis processing, and a person's face or line of sight, a product, money and the like may be detected in the same way.

As shown in FIG. 6, the distance image acquisition unit 111 first acquires a distance image containing a customer or a store staff from the 3D camera 210 (S201). Next, the region detection unit 112 detects a person who is a customer or a store staff contained in the distance image acquired in S201 (S202) and further detects each region of the person (S203). For example, the region detection unit 112 detects a person (customer or store staff) based on the image and the distance contained in the distance image by using a discrimination circuit such as SVM (Support Vector Machine), and estimates the joint of the detected person and thereby detects the bone structure of the person. The region detection unit 112 detects the region of each part such as the person's hand based on the detected bone structure.

Then, the hand tracking unit 113 tracks the hand action of the customer or the store staff detected in S203 (S204). The hand tracking unit 113 tracks the bone structure of the customer's hand and its vicinity and detects the action of the fingers or palm of the hand based on the image and the distance contained in the distance image.

After that, the hand action recognition unit 114 extracts the feature of the action of the hand based on the action of the hand tracked in S204 (S205), and recognizes a suspicious action of the customer or the store staff based on the extracted feature (S206). The hand action recognition unit 114 extracts the direction, angle, and change in movement of the fingers or the palm (wrist) as a feature amount.

For example, the hand action recognition unit 114 detects that the customer is holding the product from the angle of the fingers, and when the customer moves the fingers off the product with the hand being close to a pocket of clothes, it detects that the customer puts the product in the pocket of the clothes. Then, the hand action recognition unit 114 compares the detected action pattern with the product fraudulent acquisition pattern 151, the product fraudulent change pattern 152 and the money fraudulent acquisition pattern 153, and when the detected pattern matches any of those, it determines that it is a suspicious action. Further, the features of images of the product fraudulent acquisition pattern 151, the product fraudulent change pattern 152 and the money fraudulent acquisition pattern 153 may be learned in advance, and the state of the hand may be identified by comparing a detected feature amount with the learned feature amount.

Figure 7:
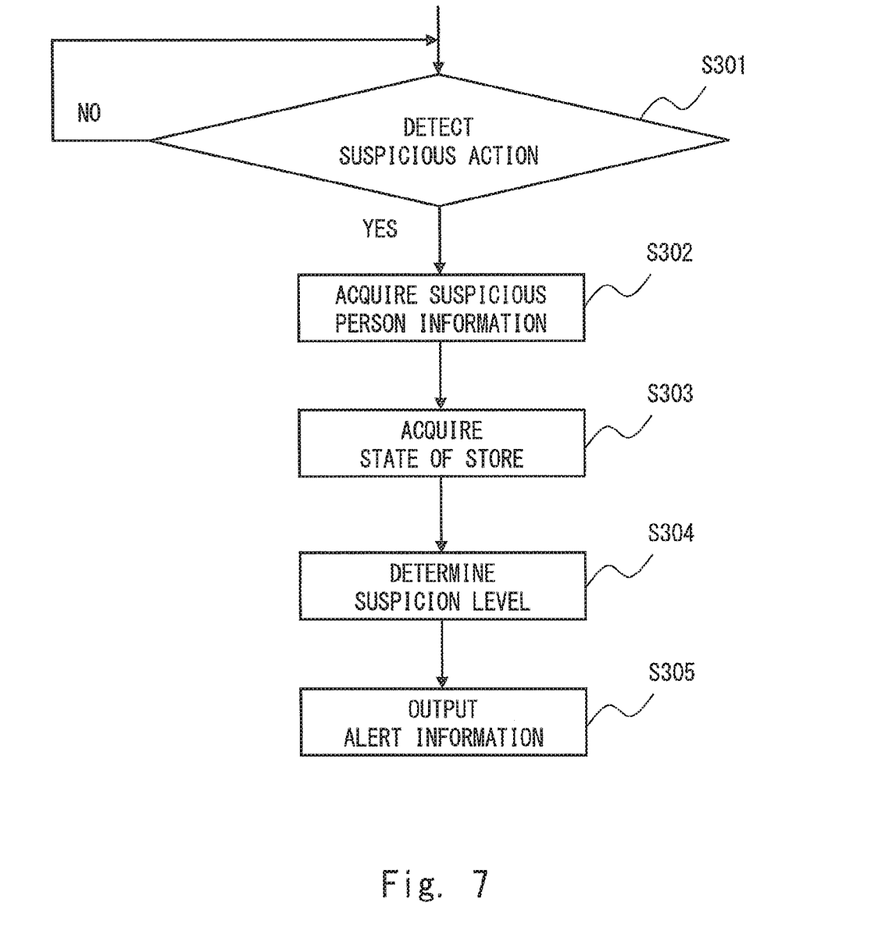
FIG. 7 is a flowchart showing the operation of an alert information generation process according to the first exemplary embodiment.

FIG. 7 shows the details of an alert output processing performed in S104 and S105 of FIG. 5.

As shown in FIG. 7, the distance image analysis unit 110 determines whether a customer or a store staff performs a suspicious action (S301). For example, the distance image analysis unit 110 determines an action of a customer that puts a product in a place other than a shopping basket or cart, such as a pocket or a bag in hand, or an action that breaks a product, damages the product, adds a foreign body, or fraudulently changes the placement. Further, the distance image analysis unit 110 determines an action of a store staff that embezzles the sales, appropriates a product (puts money in a pocket etc), or gives a product to a customer as a conspirator without receiving a full price. Besides, the distance image analysis unit 110 determines, as a suspicious action, an action such as frequently looking around, tampering or illicitly manipulating a pachinko machine, attaching a skimming device to an ATM (Automated Teller Machine), illicitly manipulating a cash register or an electronic money device, or paying public money or issuing a ticket without through a regular process. When a customer or a store staff performs the corresponding action, the following process is performed to output alert information in accordance with that action.

Specifically, the alert information generation unit 140 acquires suspicious person information (S302) and acquires the congestion in a store (S303). The alert information generation unit 140 acquires the suspicious person information indicating whether the customer is a suspicious person or not from the person recognition unit 120 so as to provide the alert information on the basis of a person recognition result by the facial image of the facial recognition camera 220. Further, the alert information generation unit 140 acquires the congestion in the store from the in-store situation analysis unit 130 so as to provide the alert information on the basis of a congestion analysis result by the in-store image of the in-store camera 230. Note that, before recognizing a customer, before analyzing the congestion, and when each information is not necessary, the acquisition of the suspicious person information and the acquisition of the congestion may be omitted.

Then, the alert information generation unit 140 determines a suspicion level of the detected suspicious action of a customer or a store staff (S304). For example, the suspicion level is assigned to each suspicious action pattern in the suspicious action information DB 150, and the suspicion level is determined by referring to the suspicious action information DB 150.

Figure 8:
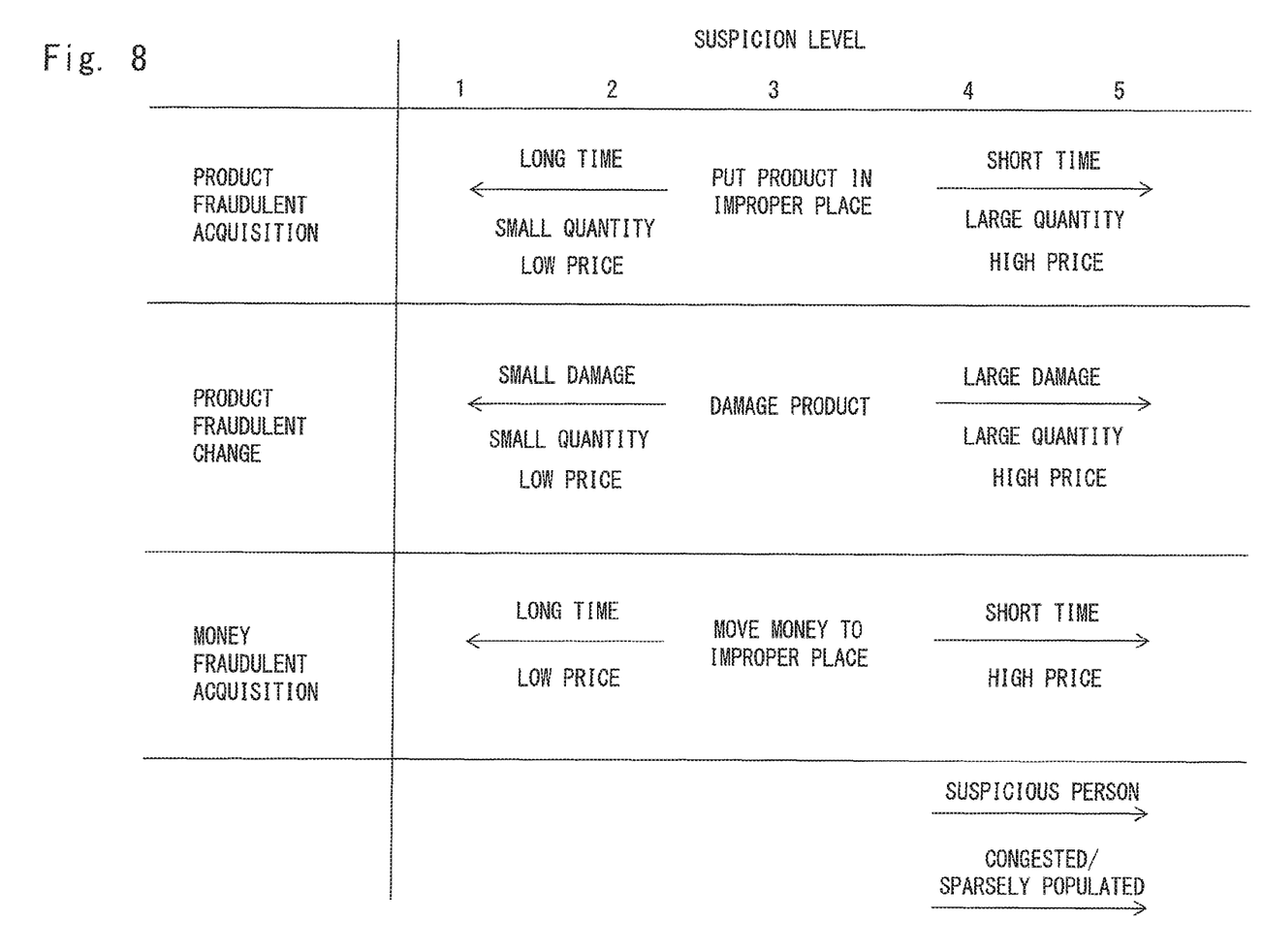
FIG. 8 is an explanatory diagram illustrating the operation of the alert information generation process according to the first exemplary embodiment.

FIG. 8 shows examples of the suspicion level of a suspicious action. For example, as shown in FIG. 8, a level is set among the suspicion levels 1 to 5. As the suspicion level is higher, it is more likely to be misconduct, for example.

As one example, when a customer's action corresponds to the product fraudulent acquisition pattern "put a product in an improper place", it is set to the suspicion level 3 by referring to the suspicious action information DB 150. Then, the suspicion level is adjusted in consideration of other parameters.

For example, when the time period of the suspicious action is short, when the quantity of products is large, or when the product is expensive, it is likely to be shoplifting. Thus, thresholds are set for the action time, the quantity of products, and the price of a product. When the time is shorter, when the quantity of products is larger, or when the price of a product is higher than such threshold, the suspicion level is set higher in accordance with the amount exceeding the thresholds. On the other hand, when the time is longer, when the quantity of products is smaller, or when the price of a product is lower than such threshold, the suspicion level is set lower in accordance with the amount falling below the thresholds.

Likewise, when a customer's action corresponds to the product fraudulent change pattern "damage a product", "open a product box", or "deform a product box", it is set to the suspicion level 3 by referring to the suspicious action information DB 150. Then, the suspicion level is adjusted in consideration of other parameters.

For example, when the damage is large or when the product box is deformed, when the time period of the suspicious action is short, when the quantity of products is large, or when the product is expensive, it is likely to be malicious. Thus, thresholds are set for the scale (rate) of the damage, the action time, the quantity of products, and the price of a product. When the damage is larger, when the time is shorter, when the quantity of products is larger, or when the price of a product is higher than such threshold, the suspicion level is set higher in accordance with the amount exceeding the thresholds. On the other hand, when the damage is smaller, when the time is longer, when the quantity of products is smaller, or when the price of a product is lower than such threshold, the suspicion level is set lower in accordance with the amount falling below the thresholds.

Likewise, when a store staff's action corresponds to the money fraudulent acquisition pattern "move money to an improper place", it is set to the suspicion level 3 by referring to the suspicious action information DB 150. Then, the suspicion level is adjusted in consideration of other parameters.

For example, when the time period of the suspicious action is short, or when the amount of money is large, it is likely to be misappropriation. Thus, thresholds are set for the action time and the amount of money. When the time is shorter or when the amount of money is larger than such threshold, the suspicion level is set higher in accordance with the amount exceeding the thresholds. On the other hand, when the time is longer or when the amount of money is smaller than such threshold, the suspicion level is set lower in accordance with the amount falling below the thresholds.

Further, when the customer is a suspicious person or when the situation in the store is congested/sparsely populated, the possibility of a suspicious action increases, and the suspicion level is set higher. In addition, the suspicion level may be set higher for an action of a customer or a store staff that looks around.

Note that, although the suspicion level is determined based on the presence or absence of a suspicious person or the state in a store after a suspicious action is detected in this example, it may be determined before a suspicious action is detected. For example, when a customer is a suspicious action, when the state in a store is congested/sparsely populated, or when a customer has an open-top bag, alert information (warning information) may be output even when a suspicious action is not yet detected. Further, in such a case, the thresholds for detection of a suspicious action (such as the time to detect a suspicious action) may be lowered to make a suspicious action easy to be detected.

After that, the alert information generation unit 140 outputs alert information based on a determination result (S305). The alert information generation unit 140 outputs the detected suspicious action and the determined suspicion level to the alert device 240. For example, the output of the alert information may be controlled based on the suspicion level. When the suspicion level is lower than a specified level, an alert is not necessary and the alert information needs not to be output to the alert device 240. Further, in this case, the alert information may be only recorded in the alert device 240 without being displayed thereon.

Further, the suspicious actions and the suspicion levels may be recorded in 3D video information. By recording the suspicion levels, it is possible to extract and check only a part with a high suspicion level and thus efficiently check the 3D video.

As described above, in this exemplary embodiment, the hand motion of a customer or a store staff is observed by the 3D camera placed at the portion from which a product shelf and a client (shopper) in front of the shelf can view to recognize a suspicious action of the customer or the store staff. When a suspicious action is recognized, alert information (alarm) is notified to an employee terminal in a shelf, a cash register, a guard's room or a store, and action is recorded.

Because it is thereby possible to precisely grasp the hand motion by the 3D camera and thereby grasp the action such as fraudulently acquiring a product, fraudulently changing a product or fraudulently acquiring money, it is possible to accurately detect a suspicious action and output alert information in accordance with the suspicious action. It is thereby possible to automate the surveillance of a suspicious action/misconduct and efficiently enhance the security, thereby improving the profit ratio.

Second Exemplary Embodiment

A second exemplary embodiment is described hereinafter with reference to the drawings. This exemplary embodiment is an example that, as a complement to the suspicious action recognition in the first exemplary embodiment, detects a suspicious action by detecting a deviant action from normal action information patterns. Specifically, the present invention is not limited to the example of the first exemplary embodiment, and a suspicious action may be determined by detecting a deviation from a store staff's normal action such as work at a cash register, rather than detecting an action of a store staff that embezzles the sales, appropriates a product (puts money in a pocket etc.) or gives a product to a customer as a conspirator without receiving a full price and the like.

Figure 9:
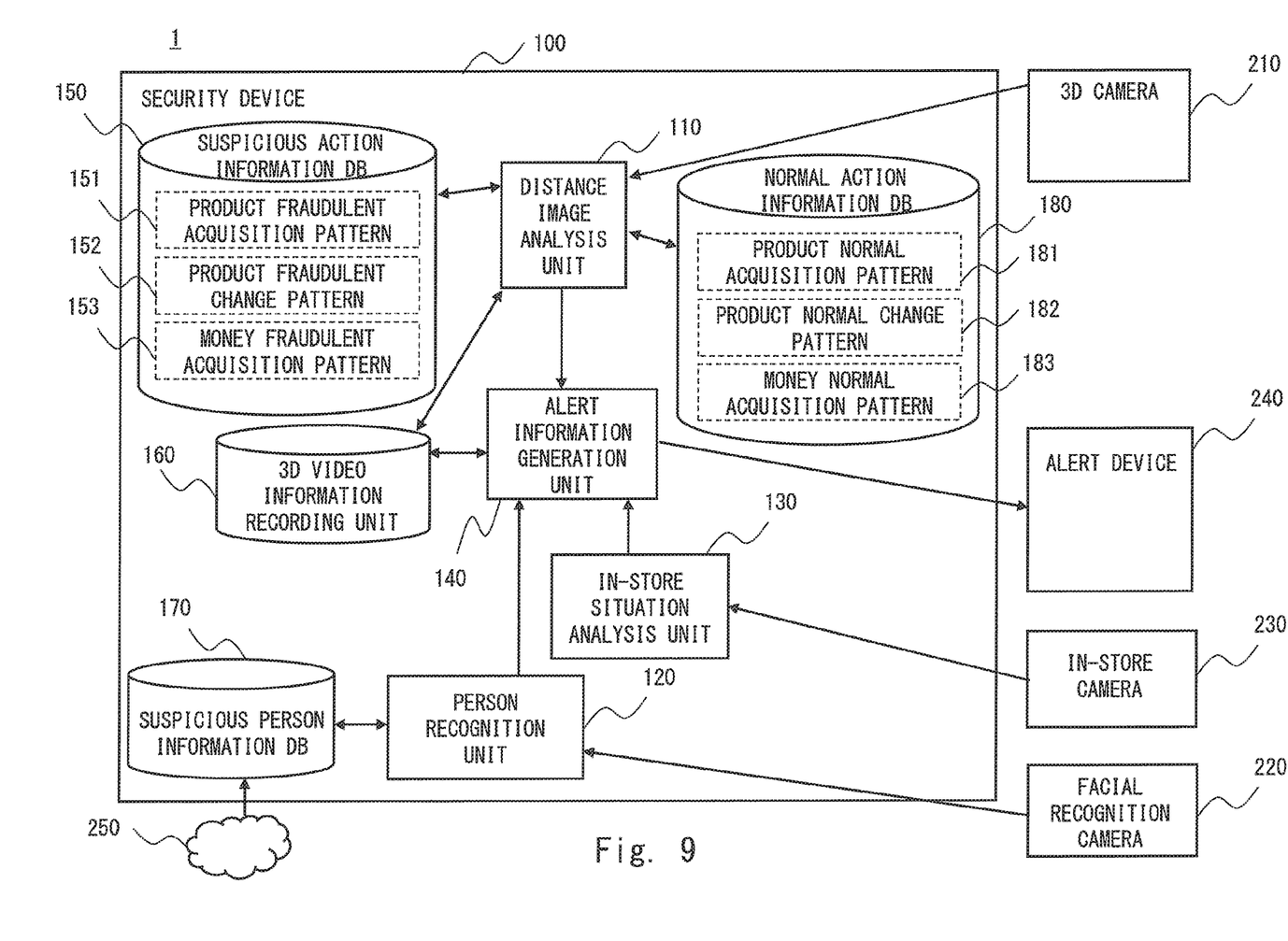
FIG. 9 is a block diagram showing the configuration of a security system according to a second exemplary embodiment.

FIG. 9 shows a configuration of a security system according to this exemplary embodiment. As shown in FIG. 9, in this exemplary embodiment, the security device 100 further includes a normal action information DB 180 in addition to the elements of the first exemplary embodiment shown in FIG. 2.

The normal action information DB 180 stores normal action patterns (normal action pattern information) indicating normal actions of a customer and a store staff. The normal action information DB 180 stores a product normal acquisition pattern 181, a product normal change pattern 182, a money normal acquisition pattern 183 and the like, for example, as the normal action patterns.

The product normal acquisition pattern 181 is pattern information about actions of normally acquiring a product, which includes an action of a customer that puts a product in a shopping basket or cart, for example. The product normal change pattern 182 is pattern information about actions of normally altering a product, which includes an action of a store staff that changes the display of a product, for example. The money normal acquisition pattern 183 is pattern information about actions of normally acquiring money, which includes an action of a store staff that performs normal cash register work and an action of a store staff that gives money from a cash register to a customer, for example.

Figure 10:
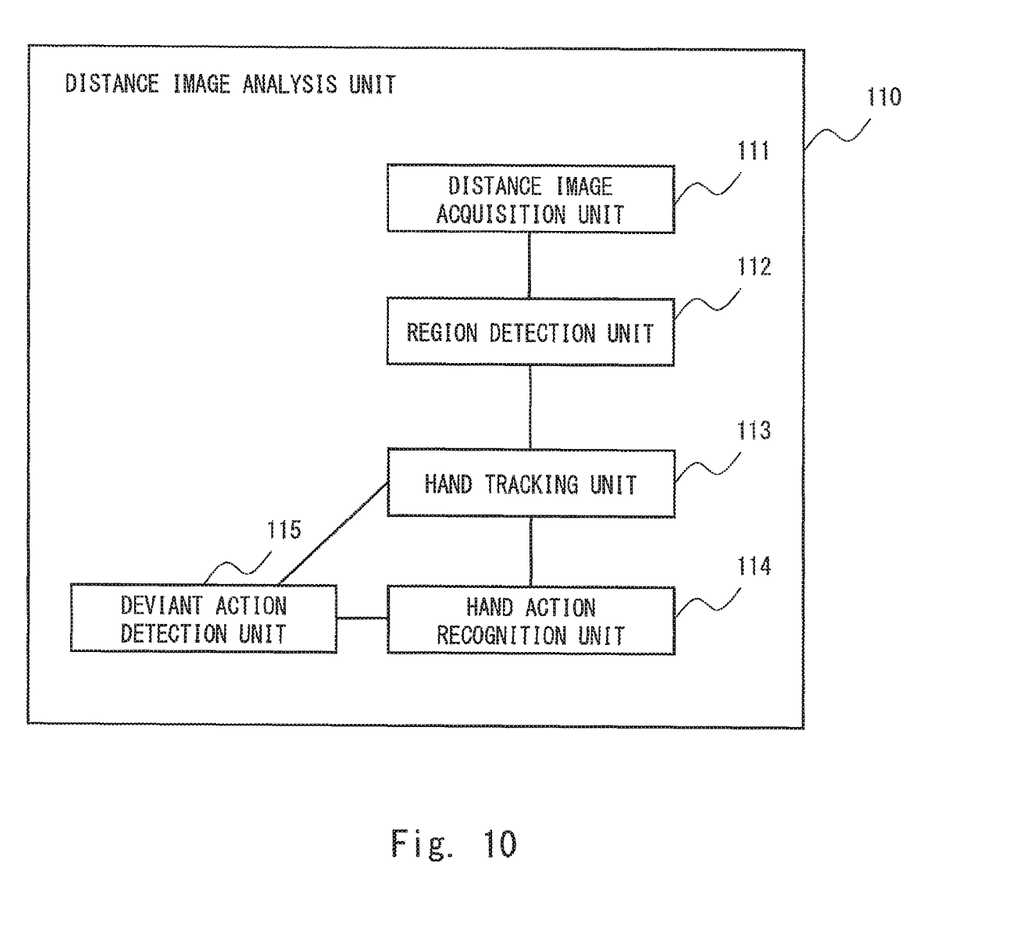
FIG. 10 is a block diagram showing a configuration of a distance image analysis unit according to the second exemplary embodiment.

FIG. 10 shows the configuration of the distance image analysis unit 110 in the security device 100 according to this exemplary embodiment. As shown in FIG. 10, a deviant action detection unit 115 is further included in addition to the elements of the first exemplary embodiment shown in FIG. 4.

The deviant action detection unit 115 detects whether an action of a customer or a store staff is deviated from a normal action (suspicious action) or not based on the hand action tracked by the hand tracking unit 113. The deviant action detection unit 115 refers to the normal action information DB 180 and compares the detected action of a customer or a store staff with the product normal acquisition pattern 181, the product normal change pattern 182 and the money normal acquisition pattern 183, and when the action of a customer or a store staff does not match any of them, determines that it is a suspicious action. For example, a suspicion level may be set in accordance with the degree of deviation from normal action patterns (the degree of mismatch).

Further, a suspicious action may be determined in consideration of both of a detection result by the hand action recognition unit 114 using the suspicious action patterns and a detection result by the deviant action detection unit 115 using the normal action patterns. For example, an action may be determined as a suspicious action when any one of the hand action recognition unit 114 and the deviant action detection unit 115 determines that it is suspicious, or an action may be determined as a suspicious action when both of the hand action recognition unit 114 and the deviant action detection unit 115 determine that it is suspicious.

As described above, by detecting a suspicious action based on whether an action of a customer or a store staff is deviated from the normal action patterns, not limited to detecting a suspicious action using the suspicious action patterns in the first exemplary embodiment, it is possible to detect a suspicious action more accurately.

It should be noted that the present invention is not limited to the above-described exemplary embodiment and may be varied in many ways within the scope of the present invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2013-185130, filed on Sep. 6, 2013, the disclosure of which is incorporated herein in its entirety by reference.

REFERENCE SIGNS LIST 1, 10 SECURITY SYSTEM
11 IMAGE INFORMATION ACQUISITION UNIT
12 TRACKING UNIT
13 SUSPICIOUS ACTION DETECTION UNIT
100 SECURITY DEVICE
110 DISTANCE IMAGE ANALYSIS UNIT
111 DISTANCE IMAGE ACQUISITION UNIT
112 REGION DETECTION UNIT
113 HAND TRACKING UNIT
114 HAND ACTION RECOGNITION UNIT
115 DEVIANT ACTION DETECTION UNIT
120 PERSON RECOGNITION UNIT
130 IN-STORE SITUATION ANALYSIS UNIT
140 ALERT INFORMATION GENERATION UNIT
150 SUSPICIOUS ACTION INFORMATION DB
151 PRODUCT FRAUDULENT ACQUISITION PATTERN
152 PRODUCT FRAUDULENT CHANGE PATTERN
153 MONEY FRAUDULENT ACQUISITION PATTERN
160 VIDEO INFORMATION RECORDING UNIT
170 SUSPICIOUS PERSON DB
180 NORMAL ACTION INFORMATION DB
181 PRODUCT NORMAL ACQUISITION PATTERN

182 PRODUCT NORMAL CHANGE PATTERN
183 MONEY NORMAL ACQUISITION PATTERN
210 3D CAMERA
220 FACIAL RECOGNITION CAMERA
230 IN-STORE CAMERA
240 ALERT DEVICE
300 PRODUCT SHELF
301 PRODUCT
302 MONEY
310 CHECKOUT STAND
311 CASH REGISTER
400 CUSTOMER
410 STORE STAFF

The invention claimed is:

1. A security system, comprising:
a memory storing instructions; and
one or more processors coupled to the memory, wherein the one or more processors are configured to execute the instructions to:
acquire input image information on an image taken of a person in a store, the input image information representing a product shelf and the person in front of the product shelf;
track an action of a hand of the person based on the input image information;
compare the tracked action of the hand with normal action patterns stored in a normal action information database, the normal action patterns including a store staff changing a display of a product;
determine a suspicious action when the tracked action of the hand does not match any of the normal action patterns stored in the normal action information database; and
output alert information based on the determined suspicious action.

2. The security system according to claim 1, wherein the one or more processors are further configured to execute the instructions to:
record the suspicious action; and
output the recorded suspicious action.

3. The security system according to claim 1, wherein the one or more processors are further configured to execute the instructions to:
set a level of the suspicious action according to content of the suspicious action, and
output the suspicious action corresponding to a new level higher than a predetermined level.

4. A security method comprising:
acquiring input image information on an image taken of a person in a store, the input image information representing a product shelf and the person in front of the product shelf;
tracking an action of a hand of the person based on the input image information;
comparing the tracked action of the hand with normal action patterns stored in a normal action information database, the normal action patterns including a store staff changing a display of a product;
determining a suspicious action when the tracked action of the hand does not match any of the normal action patterns stored in the normal action information database; and
outputting alert information based on the determined suspicious action.

5. The security method according to claim 4, further comprising:
recording the suspicious action; and
outputting the recorded suspicious action.

6. The security method according to claim 4, further comprising:
setting a level of the suspicious action according to content of the suspicious action, and
outputting the suspicious action corresponding to a new level higher than a predetermined level.

7. A non-transitory computer readable medium storing a security program causing a computer to perform a security process comprising:
acquiring input image information on an image taken of a person in a store, the input image information including a product shelf and a customer in front of the product shelf;
tracking an action of a hand of the person based on the input image information;
comparing the tracked action of the hand with normal action patterns stored in a normal action information database, the normal action patterns including a store staff changing a display of a product;
determining a suspicious action when the tracked action of the hand does not match any of the normal action patterns stored in the normal action information database; and
outputting alert information based on the determined suspicious action.

8. The non-transitory computer readable medium according to claim 7, the security process further comprising:
recording the suspicious action; and
outputting the recorded suspicious action.

9. The non-transitory computer readable medium according to claim 7, the security process further comprising:
setting a level of the suspicious action according to content of the suspicious action, and
outputting the suspicious action corresponding to a new level higher than a predetermined level.

* * * * *